(12) United States Patent
Lerner

(10) Patent No.: US 6,994,017 B2
(45) Date of Patent: Feb. 7, 2006

(54) GRILL COVER FOR COOKING SURFACES

(76) Inventor: William S. Lerner, 215 E. 68th St., Apt. 23A, New York, NY (US) 10021-5729

(*) Notice: Subject to any disclaimer, the term of this patent is extended or adjusted under 35 U.S.C. 154(b) by 149 days.

(21) Appl. No.: 10/650,259

(22) Filed: Aug. 27, 2003

(65) Prior Publication Data

US 2005/0045170 A1 Mar. 3, 2005

(51) Int. Cl.
*A47J 27/00* (2006.01)
*B65D 21/02* (2006.01)

(52) U.S. Cl. ............................... 99/376; 99/445; 99/447
(58) Field of Classification Search .................. 99/372, 99/374, 375, 376, 377, 445, 447, 444, 446, 99/401
See application file for complete search history.

(56) References Cited

U.S. PATENT DOCUMENTS

| | | | |
|---|---|---|---|
| 2,632,380 A | * 3/1953 | Knapp | 99/376 |
| 3,082,757 A | 3/1963 | Hohe | |
| 3,555,994 A | 1/1971 | Nemetz | 99/444 |
| 4,969,449 A | 11/1990 | Levin | 126/332 |
| 5,009,151 A | 4/1991 | Hungerford | 99/445 |
| 5,447,097 A | * 9/1995 | Rhee | 99/450 |
| 5,605,143 A | 2/1997 | Hebert | 126/41 R |
| 5,606,905 A | 3/1997 | Boehm et al. | 99/375 |
| 6,247,392 B1 | * 6/2001 | Yung | 99/340 |
| 6,463,924 B1 | 10/2002 | Osterman | 126/41 R |
| 6,536,489 B1 | 3/2003 | Rowan et al. | 150/165 |
| 6,718,866 B1 | * 4/2004 | Robinson | 99/445 |

OTHER PUBLICATIONS

George Foreman grill owner's manual, by Salton Housewares, 97.
Wal*Mart website pages for Hamilton Beach Health Smart Contact.
Grill, May 13, 2003.
Yahoo Internet pages for Hamilton Beach Grills & Sandwich Makers, May 13, 2003.
Internet pages from Reynolds Kitchens catalogue, Frequently Asked Questions section, dated Jun. 9, 2003.

* cited by examiner

*Primary Examiner*—Reginald L. Alexander
(74) *Attorney, Agent, or Firm*—Steven Horowitz

(57) ABSTRACT

A disposable grill cover for indoor counter top grills having two cooking plates such as the George Foreman® grills contains a first and second sheet or sheet portion of aluminum foil of a fixed shape designed to mate with the two contoured cooking surfaces of the grills. The sheets are positioned over the cooking surfaces of the grill using tabs on each side of the sheets extending the same layer of aluminum. The contoured surface including ribs/grooves and bumps of the two sheets correspond exactly to the contoured surface including ribs, bumps and a rim on the two cooking surfaces of the grill to minimize heat loss. Cleaning the grill from fat, grease and odor from food residue is avoided before each use. A front extension of the first sheet extends into and covers the interior surface of the drip tray of the George Foreman® grill.

45 Claims, 4 Drawing Sheets

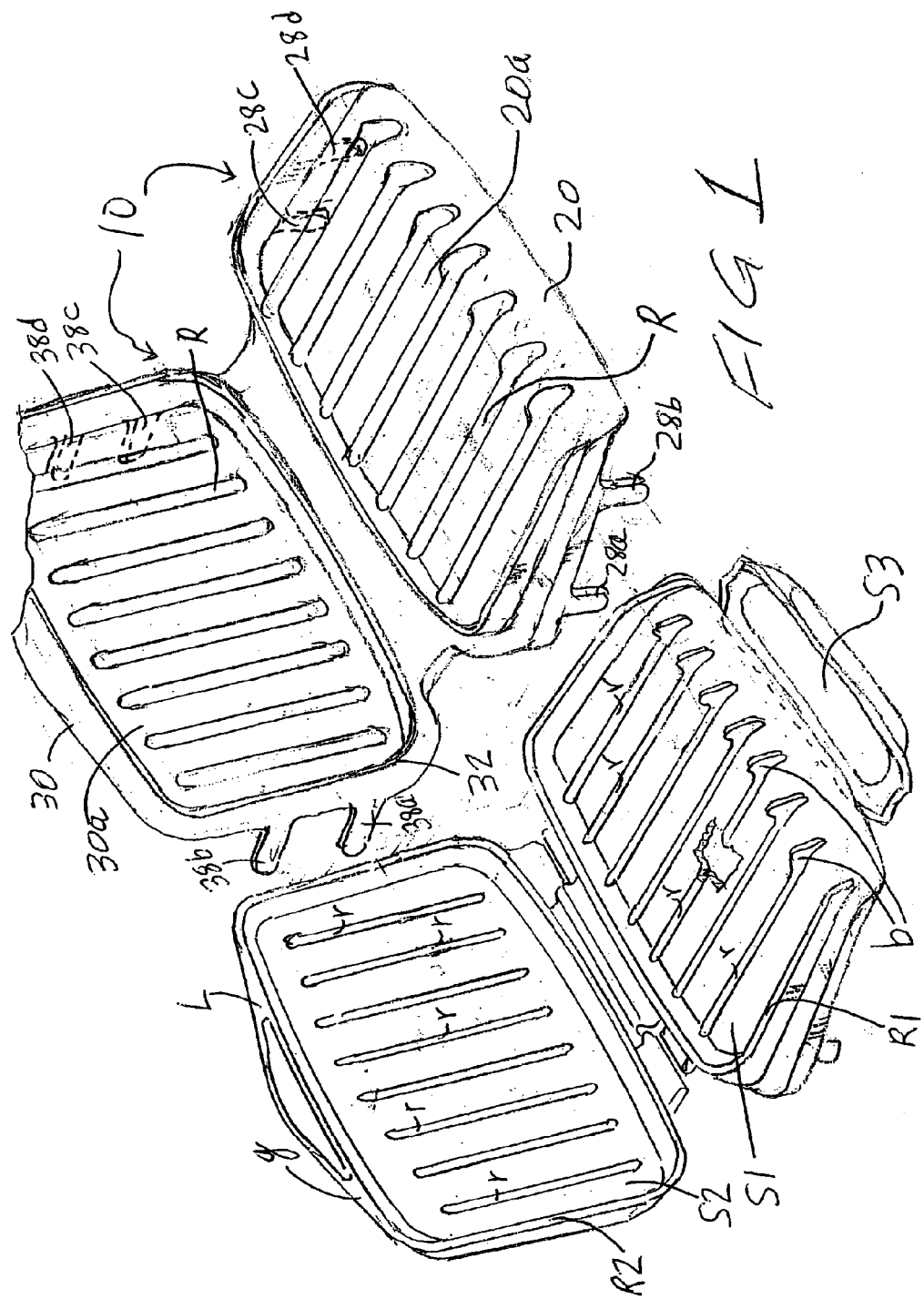

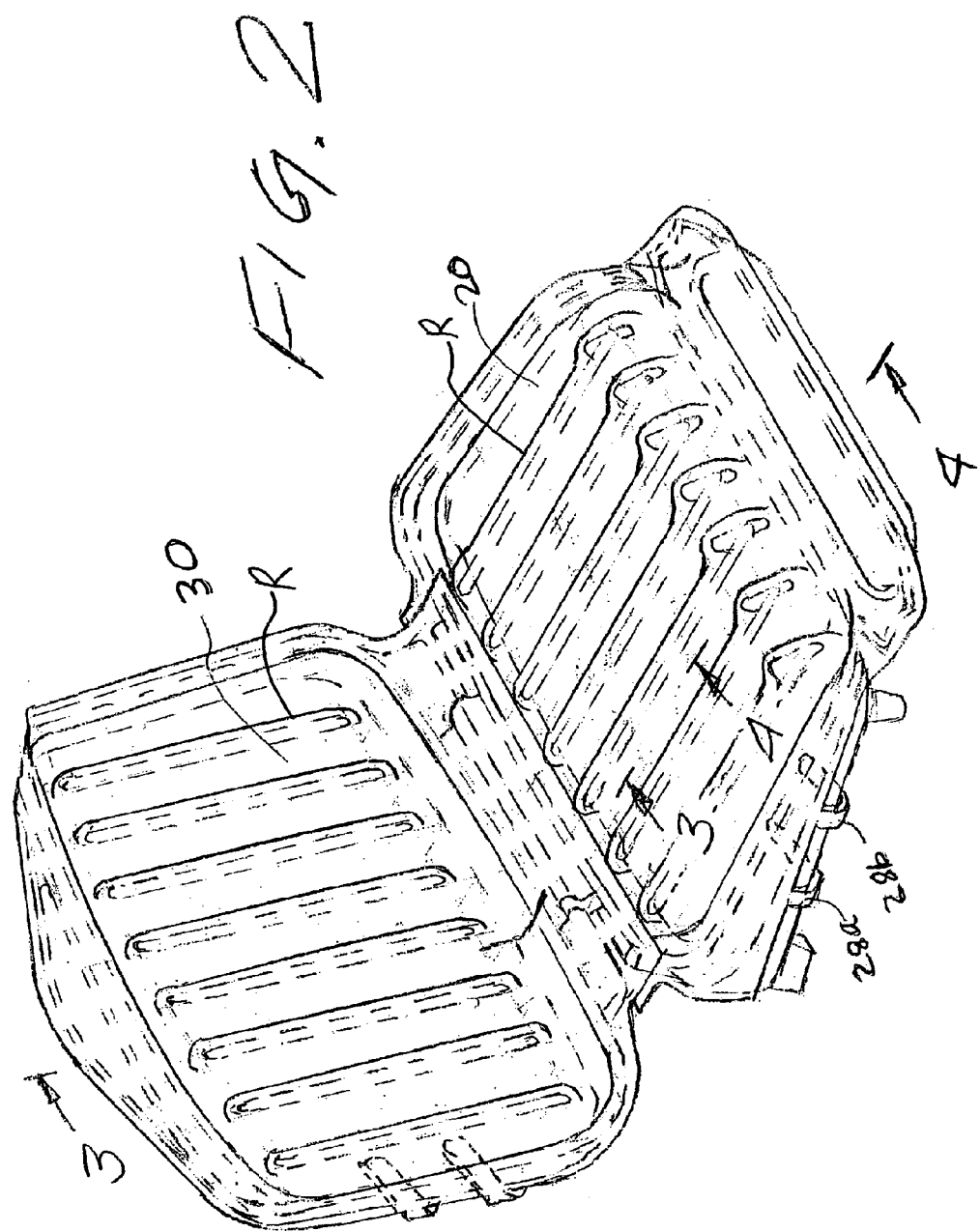

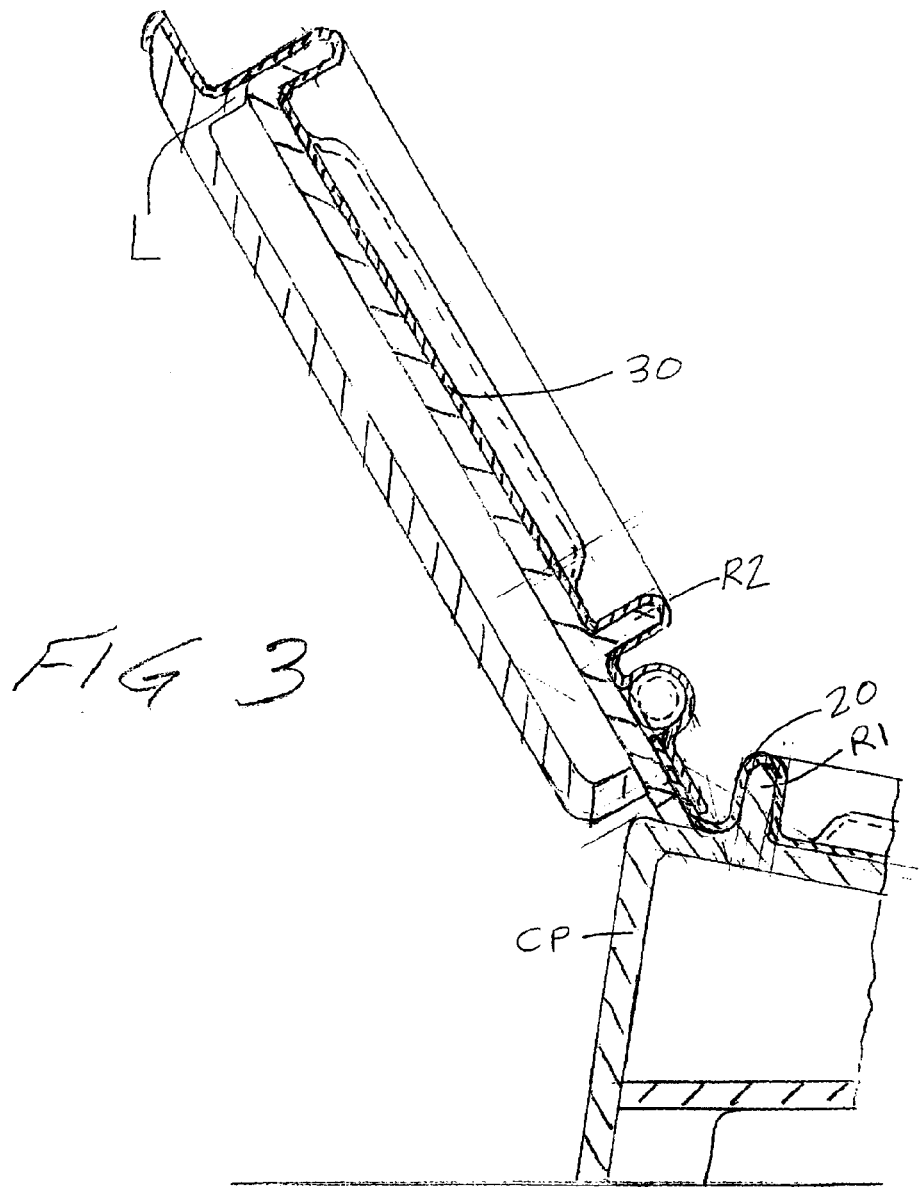

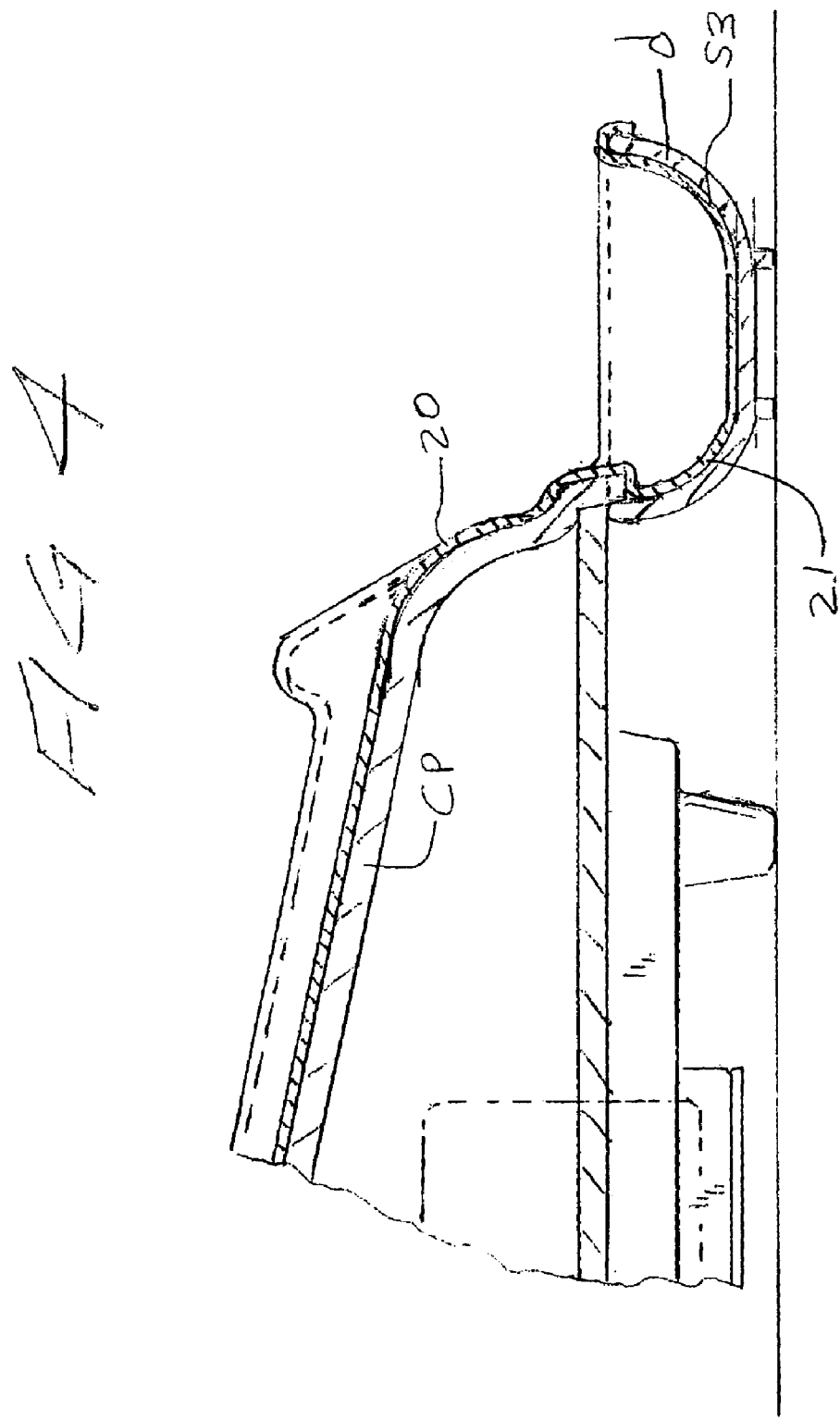

GRILL COVER FOR COOKING SURFACES

FIELD OF THE INVENTION

The field of this invention is covers for grills, and more particularly, a grill cover or cover assembly for the cooking surfaces of grills.

BACKGROUND OF THE INVENTION AND DISCUSSION OF THE PRIOR ART

Grills are a kind of electric cooking device. Recently, portable indoor grills that can be positioned on counter tops in the kitchen have become prevalent. Whereas grills were previously associated with a lot of smoke, indoor counter top grills drain enough fat to avoid burning oil and grease and smoking up the kitchen. Since grilling is a healthier way to cook meats and other foods, these indoor counter top grills have become very popular over the last seven or so years. Indoor grills have been made more convenient than the clumsy outdoor grill of decades ago. Sleek stand alone indoor counter grills, such as the George Foreman® grill sold by Salton, Inc. of Lake Forest, Ill. or the Hamilton Beach® line of grills sold by Hamilton Beach/Proctor-Silex, Inc. of Southern Pines, N.C., have become popular ways of grilling meat, poultry, seafood, vegetables, fruit and breads. These grills are popular because they are convenient and reasonably priced ways of grilling the above kinds of foods indoors—they are compact, they do not create large amount of smoke, they are fairly simple to use, are reasonably priced, etc.

Even though these grills are generally convenient to use, and even though these grills are designed to drain off much of the food residues that accumulate, they still suffer from the drawback of requiring repeated and tedious cleaning. In particular, although these counter top grills have non-stick cooking surfaces and are shaped to provide drainage of unwanted fats, greases and other food refuse out of the grill because the cooking surface is inclined and channeled, use of the grills still leaves significant food residues. The George Foreman® grill actually comes with its own scraper for cleaning off food residues from its two cooking surfaces. As a result, thoroughly cleaning off food residue from the surfaces of the cooking plates of these grills is still necessary before further use.

Presently, the grill's care booklet's cleaning instructions instruct a consumer to perform the following tedious steps of cleaning before each use of these grills: (1) scrape the cooking surface of the upper cooking plate, (2) scrape the cooking surface of the lower cooking plate, (3) wipe each of these two cooking surfaces thoroughly with a cloth towel or the like, (4) clean the scraping tool used to perform steps (1) and (2) and (5) clean and/or scrape the drip tray, in the case of those models, such as the George Foreman® grill, that have drip trays. The George Foreman® grill actually comes with a scraper.

Cleaning the drip tray and scraper are very difficult once the fat and grease has dried. It is also difficult to put such items in the dishwasher because of their shape.

These cleaning steps have to be performed each time the grill has to be used since the grilling process by its nature leaves food residues every time. It is difficult to clean every ridge and groove of the grill. certain items such as fish have a strong odor and requires particularly meticulous cleaning. Performance of these cleaning steps is time-consuming, tedious and tiresome and directly weighs against popular use of the grill. Moreover, the fact that these grills are by their nature popular due precisely to their convenience and simplicity, means that the inconvenience and difficulty of having to clean food residue from their cooking surfaces directly undercuts the value and the very purpose of these grills.

The present situation where the grills requires tedious cleaning suffers from the additional problem that it has led users of the grill to use alternative cleaning methods that are dangerous. For example, although it is not mentioned in the care and use instructions booklet that accompanies the George Foreman® grill, it is commonly known by owners of this grill that the most effective way of cleaning the George Foreman® grill and other counter top grills is to wipe down the cooking surfaces with a wet paper towel while the grill is still hot and the fatty grease has not yet dried onto the cooking surfaces. This has to be done right after the food is removed from the grill, which means that the food is getting cold and diminishing the "hot off the grill" appeal. It is well known to do this and consumers do this. The problem is they also get burned doing it. These grills contain no warning device indicating when they have cooled down beyond the point when they are turned off. In addition, the lid of the grill often closes accidentally while trying to clean with the wet towel. Therefore, consumers often burn their arms and hands when attempting to wipe the hot cooking surfaces of the grill to save work. In sum, the official cleaning system for these grills is tedious and is often avoided and the cleaning method most likely to be used is not safe.

It is noted that the new user maintenance instructions for the George Foreman® grill states that for stubborn build-up one should "use a wet sponge while the [grill] is still somewhat warm". This presents two problems. First, consumers often miscalculate how "warm" the grill is and get burned. Second, one would ruin one's sponge in using it to clean fish grease and other fatty grease and grime from the grill since cleaning off the sponge after using the sponge to clean the grill would be difficult. That may be why consumers use a wet paper towel but that is dangerous, as explained above.

Besides cleaning these counter top grills, it is also necessary to remove any lingering smell that would interfere with a further use of the grill. In particular, fish emit strong odors which remain on the grill after use. This odor problem is a strong impetus for consumers to wipe the cooking surfaces down with a wet paper towel while the grill is still very warm rather than scraping away the dried grease later. In an illustrative example, one woman stopped using her George Foreman® grill for fish because she claimed that the only effective way to remove the fish odor was by wiping it down wet while hot and she got burned while doing this. So she simply does not cook fish in it anymore. Many people do not use these grills at all due to the cleaning problem.

Accordingly, there is a compelling need to provide an apparatus or way that allows using these counter grills without having to constantly clean the cooking surfaces of these grills after each use. There is a compelling to have such an apparatus whose use in conjunction of the grill would not in any way detract from the present advantages of use of the grill, for example, maintaining the non-stick surfaces that are in contact with the food, being able to drain off the fats using the inclined lower cooking surface of the grill, etc. Such an apparatus should also address the cleaning problems on every cooking surface of the grill, i.e. the lid also and not just the lower cooking surface. Further, there is a compelling need to have a way to use these counter top grills without any unsafe cleaning or deodorizing steps likely to be taken prior to each re-use.

Although barbecue grill covers have been the subject of numerous patents, for example U.S. Pat. No. 4,969,449 to Levin, U.S. Pat. No. 5,009,151 to Hungerford, U.S. Pat. No. 3,555,994 to Nemetz and U.S. Pat. No. 3,082,757 to Hohe, the prior art is not known to have provided an apparatus or method that effectively addresses the above concerns and presently such grills are used in a manner that still officially requires tedious, time-consuming scraping and cleaning and unofficially invites unsafe cleaning methods. The present invention does address the above compelling needs, successfully provides an answer to them and provides many other important advantages.

In addition to cleanliness, there is a different problem of food separation. Sometimes a grill or other cooking utensil is shared by individuals who observe different rules concerning the food involved. For example, a person observing kosher dietary laws may share an apartment including its cooking facilities with someone who either does not observe such laws or who does not observe them as strictly. Similarly, a very strict vegetarian might share cooking facilities with a carnivorous individual and may not want their food cooked on a cooking surface that has any meat residue on it. In such situations, completely separating the food being grilled from the cooking surfaces of the grill upon which the food is placed can be important to the one who desires to avoid mixing or contacting certain kinds of foods. Even aside from sharing, a single individual may desire to have a method of separating a cooking surface used for meat from dairy products and vice versa in furtherance of kosher dietary laws. An apparatus that provides the food separation advantages sought while also solving the cleaning problems discussed above would be particularly valuable.

SUMMARY OF THE PRESENT INVENTION

A grill cover or grill cover assembly for covering the cooking surfaces of indoor counter top grills having two cooking plates and ribs such as a George Foreman® grill, Hamilton Beach® grills and certain panini makers, comprises a continuous thin sheet having a first and second sheet portion—or in certain embodiments a separate first and second thin sheet—of durable heat conducting material having a fixed shape, such as extra heavy duty aluminum foil or other suitable in expensive and easily moldable material that can withstand temperatures commonly reached during grilling of food. Each of the two sheets or sheet portions has an upper surface and a lower surface, the sheets or sheet portions include parallel ribs and grooves that correspond to the parallel ribs and grooves appearing on the cooking surfaces of the grill's cooking plates so that the entire first sheet or sheet portion mates snugly with the whole contoured first cooking surface of the grill and the entire second sheet or second sheet portion mates snugly with the whole contoured second cooking surface of the grill. The ribs/grooves run through the whole thickness of the sheets. The ribs have bumps on the front end in most embodiments. With respect to the George Foreman® grill, which includes a drip tray, a front of the first sheet or sheet portion extends over a front lip of the grill and continues into and covers an inside surface of the drip tray positioned in front of the grill. Each sheet or sheet portion also includes one to three tabs on each side for folding that sheet or sheet portion on each side over the corresponding side of the cooking plate of the grill as a simple way of temporarily attaching the sheet or sheet portion to the cooking plate. In certain embodiments, the upper surface of the first sheet and the lower surface of the second sheet have a non-stick coating thereon for contact with the food.

IMPORTANT OBJECTS AND ADVANTAGES

The following important objects and advantages of the present invention are:

(1) to provide a grill cover for the cooking surfaces of an indoor grill;

(2) to provide such a grill cover that is disposable;

(3) to provide such a grill cover that is inexpensive since it is made of simple aluminum foil or other suitable material molded to a particular shape;

(3) to provide such a grill cover that attaches to the cooking surfaces of particular popular indoor grills;

(4) provide such a grill cover that attaches to the cooking surfaces of the George Foreman® grill sold by Salton, Inc.;

(5) to provide a grill cover that attaches to the cooking surfaces of Hamilton Beach® grills such as the Compact Contact Grill, the HealthSmart Grill and the MealMaker Express Grill;

(6) to provide such a grill cover having similar or better non-stick surface features as that of the surface that is covered;

(7) to provide such a grill cover that also covers the inner surfaces of a drip pan associated with the George Foreman® grill;

(8) to provide such a grill cover wherein two sheets of fixed shape have grooves running through a thickness of the sheets and that snugly conform to the ribs of each cooking surface of one of the above grills so that each sheet conforms in mating relation to a cooking surface of the grill;

(9) to provide such a grill cover for the upper cooking surface and one for the lower cooking surfaces of one of the above grills;

(10) to provide such a grill cover that covers the drip pan of the George Foreman® grill;

(11) to provide such a grill cover each of whose sheets has extending therefrom tabs or other inherent means for conveniently and instantly attaching to the applicable cooking surface being covered;

(12) to provide a grill cover for counter top indoor grills that avoids the necessity of having to scrape or clean the cooking surfaces of the grill;

(13) to provide a grill cover for counter top grills that saves burn injuries by eliminating the need for consumers to clean the cooking surfaces of the grills in a manner than risks burning of the skin;

(14) to provide a grill cover for indoor counter top grills that eliminates the difficult task of removing the fish odors or other food odors from the cooking surfaces of the grill;

(15) to provide a safe alternative to the tedious cleaning of indoor grills;

(16) to provide an apparatus that eliminates the danger from the mixture of water and electricity that occurs when consumers clean a grill with a wet towel or sponge;

(17) to provide a separation between the food being grilled and the coking surfaces of the grill itself that assists individuals in observing dietary laws that mandate the separation of dairy and meat products;

(18) to provide a separation between the food being grilled and the grill itself to further certain individuals' avoidance of contact with certain foods such as non-kosher meat products in situations where that person is forced to share use of the grill with an individual who does not observe the same dietary laws;

(19) to provide a grill cover that avoids the inconvenience of having to rinse off one's grill prior to use when the grill has been unused for a substantial amount of time;

(20) to provide a grill cover that eliminates the odor of fish on one's grill;

(21) to provide such a grill cover that can also accommodate grills that have a drip tray positioned in front of the grill; and

(22) to provide an apparatus that does the above and that can be in the cover of a grill cover or alternatively in the form of a cover assembly of two separate sheets.

BRIEF DESCRIPTION OF THE DRAWINGS

FIG. 1 is an exploded isometric view of the grill cover of the present invention also showing a grill to which it would be attached with the cover assembly having a broken away groove;

FIG. 2 is an isometric view of a grill cover assembly of the present invention including a front extension for a drip dray, the assembly in place on a grill that has a drip tray positioned in front of the grill;

FIG. 3 is a sectional view of FIG. 2 taken along line 3—3; and

FIG. 4 is a sectional view of FIG. 2 taken along line 4—4.

DETAILED DESCRIPTION OF THE PREFERRED EMBODIMENT

The apparatus of the present invention will now be illustrated by reference to the accompanying drawings. The grill cover assembly of the present invention has been assigned reference numeral 10 Other elements have been assigned the reference numerals referred to below.

The term "George Foreman® grill" is defined to mean the grills of all sizes that are manufactured and/or sold by Salton, Inc. under the brand name "George Foreman®". The term "Hamilton Beach grill" is defined to mean any size of the counter top grills manufactured and/or sold by Hamilton Beach/Proctor-Silex, Inc., for example Hamilton Beach Compact Contact Grill, Hamilton Beach HealthSmart Grill and Hamilton Beach MealMaker Express Grill.

Preliminarily, it is noted that FIG. 1 shows grill cover 10 as a single continuous sheet 10 having first sheet portion 10 and second sheet portion 20. In contrast, FIGS. 2–4 depict a grill cover assembly 10 having first thin sheet 10 and a separate second thin sheet 20. Accordingly, the term "grill cover" as used herein can also refer generally to the present invention in general, meaning a grill cover of one continuous sheet or a grill cover assembly of two sheets unless the term "grill cover" from the context is specifically referring to the embodiment of a grill cover having one continuous sheet. Furthermore, while the grill g shown in FIG. 1 has a drip tray d, grill cover 10 shown in FIG. 1 does not include a pre-shaped front extension 21 that would fit into the drip tray d. This is to show that grill cover 10 or cover assembly 10 can exist with or without front extension 21 of sheet 20 or of sheet portion 20 and as such can therefore cover or not cover a drip tray d positioned in front of grill g, depending on how it is used.

As seen from FIGS. 1–4, grill cover 10 is in the preferred embodiment a single continuous sheet 10 that includes first sheet portion 20 (also called first thin sheet portion 20) and second sheet portion 30 (also called second thin sheet portion 30). Each sheet portion 20, 30 has an upper and a lower surface. One of these surfaces is active in that it that faces the food and one is inactive in that it does not but rather is contact with and mates with the cooking surface of the grill. Each sheet portion 20, 30 is sufficiently rigid to have a fixed shape which allows easy placement of the sheet over the contoured surfaces of the cooking plates of the grill to which the assembly is attached. The fixed shape of the sheet portions 20, 30 is such that the contoured surface 20a, 30a of each sheet portion 20, 30 corresponds with the contoured surface of the respective cooking surfaces of the grill. Thus, the contoured surface 20a of the first sheet portion 20 corresponds exactly to the contoured surface of the first cooking surface S1 and the contoured surface 30a of the second thin sheet portion 30 corresponds to the contoured surface of the second cooking surface S2.

Although grill cover 10 of the present invention has been described as one continuous sheet 10, in an alternative embodiment, it can be grill cover assembly 10 made up of two separate sheets 20, 30. Everything is the same except sheet portion 20 has been broken away from sheet portion 30 to form sheets 20, 30. In this case sheets 20, 30 can overlap, as best seen from FIG. 3, in order to cover the areas at the ends of the cooking plates of grill g, or can have a space between them. While the remaining description will describe the invention in terms of one single continuous sheet 10 having first and second sheet portions 20, 30, it should be understood that what is described also applies to the embodiment of the present invention made up of first thin sheet 20 and second thin sheet 30.

Grill cover 10 is designed to be used in conjunction with grills having two cooking plates, one of which being referred to as a lid, wherein one cooking plate, the lid, can close onto the other cooking plate. It is not necessary that the closure be a complete one. Grill cover 10 is also designed to be used with specific sizes and models of grills made by specific, preferably well known, manufacturers of grills. Thus the lower surface 29 of sheet portion 20 and the upper surface 39 of sheet portion 30 have grooves that are designed to exactly mate with the cooking surfaces of the cooking plates of particular model grills. Thus grooves on the under surface of the sheet portion 20, 30 can be said to mate with the ribs on the cooking surfaces S1, S2 of the cooking plates of the grill. As a matter of semantics it can also be said that the contoured surface of each sheet portions 20, 30 mates with the corresponding contoured surface of the cooking surface S1, S2. The mating is a snug fit so as to minimize any heat loss between the grill's cooking surfaces S1, S2 and the surfaces of the sheet portions 20, 30. Typically, there is enough space in the grill between the cooking surfaces of the two cooking plates when the lid of the grill is closed that the fixed shape of sheets 20, 30 do not disturb each other. Alternatively, the weight of the lid 1 is not sufficient to disturb the shapes of sheet portions 20, 30.

Grill cover 10 can also be used with panini makers, which grill paninis (cheese and/or sandwiches) and quesadilla makers, which grill quesadilla (filled wheat tortilla topped with meat and/or cheese) assuming they have two cooking plates one of which closes on the other and wherein each cooking plate has cooking surfaces that have parallel ribs.

Due to the thinness of sheet portions, 20, 30, the parallel grooves/ribs on the first and second sheet portions 20, 30 run though the entire thickness of each sheet portion. Accordingly, it can be said that the entire sheet portion 20, 30 (rather than the upper or lower surface of said sheet portion) has grooves or ribs (depending on the side of the sheet 20, 30 that one is viewing) that correspond to the ribs r protruding from the cooking surfaces S1, S2 of grill g. Note that in a preferred embodiment, since each sheet portion 20, 30 has its grooves/ribs through its entire thickness, what appears as a groove when viewed from a top surface of a sheet portion 20, 30 also appears as a rib when viewed from the bottom surface, and vice versa.

For ease of reference, the following reference characters indicate in FIGS. 1–4 the following parts of the grills to which the cover assembly of the present invention is attached. Grill g has two cooking plates CP, L each of which has a cooking surface. The cooking plates of the grill g to which assembly 10 is attached have cooking surfaces that generally come into contact with the food being cooked or grilled. The cooking surface S1 of the primary or "lower" cooking plate CP is where the food is deposited to be grilled. The second or upper cooking plate is the "lid" L of the grill and has its own cooking surface S2 that closes onto a top portion of the food that has been placed on the cooking surface of the lower cooking plate. Thus, grill g consists essentially of upper cooking plate L having cooking surface S2 and lower cooking plate CP having cooking surface S1. The George Foreman® grill also has drip tray d with inside surface S3.

The cooking surfaces of the grill g have generally parallel ribs r running vertically, horizontally or diagonally across the plane of the cooking surface S1, S2. With respect to the George Foreman® and Hamilton Beach® grills, each of the ribs r have at a front end thereof a protruding bump b at or near the front end of ribs r in order to prevent the food on first cooking surface S1 from sliding off the inclined cooking surface S1. Both first cooking surface S1 and second cooking surface S2 also have rims that are part of the cooking surface. First cooking surface S1 upon which the food is placed has first rim R1 surrounding said first cooking surface. Second cooking surface S2 which is inside lid L has second rim R2 surrounding said second cooking surface S2. With regard to the George Foreman® grill there is also a drip tray d that is positioned in front of the lower looking plate. The drip tray is designed to collect run-off from the cooking surface of the lower cooking plate since that cooking plate is inclined slightly.

Sheet portions 20, 30 are thin so as to not significantly alter the cooking surface S1, S2 to which the sheet portion is applied. Sheet portions 20, 30 are pre-shaped and are of generally uniform thickness to maintain the contour of the cooking surfaces S1, S2. Sheet portions 20, 30 are of predetermined length and width to cover cooking surfaces S1, S2 of the grill to a point exterior to the rim of the cooking surface and preferably to overlap and cover the extra surface of grill g between the rims R1 and R2. For example, first thin sheet 20 has a rim portion 22 that extends over the first rim R1 of first cooking surface S1 and second thin sheet 30 has a rim portion 32 that extends over the second rim R2 of second cooking surface S2

In the case of the smallest model George Foreman® grill the width from rim to rim of cooking surface S1 is approximately seven inches and its length is approximately six inches. To accommodate these dimensions, it is clear that the dimensions of first thin sheet portion 20 are similar such as to cover the entire surface of cooking surface S1 from rim to rim including the rim R1 itself and the bumps b on the ribs r. Sheet portion 30 also has to match the dimensions of cooking surface S2. Sheet portion 20 has parallel ribs R that fit over parallel ribs r of grill g and has bumps B that correspond to and fit over bumps b on the grill g. Parallel ribs r of cooking surfaces S1, S2 are sometimes referred to as parallel elongated rased portions to distinguish them from ribs R on grill cover 10. Front extension 21 of sheet 20 covers the top and inside of drip pan d. The larger models of the George Foreman® grill have the same basic proportions as the smaller models.

With respect to the Hamilton Beach® grill models and the models of other brand of indoor counter top grills having two cooking plates, one of which is lid that closes on the other cooking plate, although FIG. 2 depicts the cover assembly 10 in the context of the George Foreman® grill in that sheet 20 has front extension 21 for drip tray d, is understood that grill cover 10 for Hamilton Beach® grills otherwise has the same features except for the configurations of the parallel ribs r on the grill g. That is, in the Hamilton Beach® grills, the ribs may be diagonal, horizontal or vertical with respect to the cooking surfaces S1, S2. In each case, sheets 20, 30 of grill cover 10 are adapted to exactly match theat configuration. Similarly, if in any model of either the George Foreman® or Hamilton Beach® grill the rim R1, R2 around cooking surfaces S1, S2 has a smaller or larger distance to the outermost rib r, then accordingly the contoured surface 20*a*, 30*a* of sheets 20, 30 are adjusted for this. The same is true with any dimensional differences between the various models. For other models besides Hamilton Beach® and George Foreman® grills, there may not be bumps b on the front end of ribs r, in which case ribs R of sheet portion 20 will also not have bumps B. FIGS. 1–4 shows the basic features of grill cover 10 but the exact dimensions are determined by the model of the George Foreman® or Hamilton Beach® or other grill being sold. In this regard, it should be noted that if in a number of years the dimensions change, then the dimensions of sheets 20, 30 of cover assembly 10 also change accordingly. However, the basic elements of grill cover 10 remain the same.

Furthermore, sheet portions 20, 30 are made of good heat-conducting material so that the heat of the grill can pass through to the food without significant heat loss. Accordingly, sheets 20, 30 are typically made of aluminum foil or thin aluminum. Aluminum foil sold by Reynolds Consumer products, a business of Alcoa of Richmond, Va., comes in thicknesses called standard (approximately 0.00065 inches thick), heavy duty (which is approximately 0.00094 inches thick) and extra heavy duty, (which is approximately 0.00140 inches thick). Sheet portions 20, 30, if made from aluminum foil, should preferably although not absolutely necessarily be thicker than standard or heavy duty thickness aluminum foil in order to maintain a rigid shape. Aluminum foil of extra heavy duty thickness is preferable for use of sheet portions 20, 30. There are well known products that can be used for sheet portions 20, 30. For example, Reynolds® Hot Bags® sold by Reynolds Consumer Products, a business of Alcoa, Inc. of Richmond, Va., is extra heavy duty aluminum foil and represents the approximate preferred thickness of sheets 20, 30.

Sheet portions 20, 30 should not be so thick that their thicknesses interferes with the topography of the cooking surfaces they are placed on. Accordingly, while the present invention contemplates that sheets 20, 30 can be thinner or thicker than 1.4 mils (thousandths of an inch), it might be that at thicknesses less than a mil or half a mil the sheets 20, 30 will not maintain a fixed shape, and at thicknesses above approximately 5 mils the sheets will be too bulky. Accordingly, although sheet portions 20, 30 can have a range of thickness between approximately half a mil and approximately five more mils, any thickness that is not too thick that it is hard to mold or interferes with closing the lid or does not transmit heat properly and any thickness that is not too thin that it cannot maintain a fixed shape or disintegrates is acceptable.

In one alternative embodiment, sheet portions 20, 30 can be made of aluminum that is thinner than 0.65 mils but that is thicker near the perimeters of each sheet portion 20, 30. In a further alternative embodiment, sheet portions 20, 30 can be rolled inwardly on the perimeters for extra stability.

Aluminum is an easily moldable metal and will not melt until it reaches approximately 1200 degrees Fahrenheit. Accordingly, aluminum foil is a suitable material for sheet portions 20, 30. The present invention, however, contemplates that other materials may be used to produce first and second sheet 20, 30. Such other material has to be rigid enough to have a fixed shape and be able to withstand the high temperatures that occur during grilling such as approximately 450 to 600 degrees Fahrenheit over a period of time and preferably approximately 40–50 minutes. Accordingly, the present invention contemplates use of other materials for sheet portions 20, 30 that can withstand the above temperatures. In addition, the material of sheets 20, 30 has to conduct heat without significant heat loss at the thickness needed and would have to be durable enough to withstand the above grilling temperatures for approximately 40–50 minutes. It is anticipated that in the future grilling may occur at even higher temperatures, in which the material would have to accommodate such temperatures for the length of time grilling would occur. Furthermore, such other material would have to also be inexpensive to produce. The grill cover 10 is intended to be disposable so the material would not necessarily have to be able to withstand such temperatures on a repeated basis, if that matters. Typically, malleable metals fit these characteristics and aluminum is relatively inexpensive.

Other than aluminum there may be other metals that are easily moldable, lightweight and inexpensive. "Lightweight" is defined to mean as light as aluminum or heavier by a factor of up to approximately fifty percent. "Inexpensive" is defined to mean as inexpensive as aluminum as most costly by a factor of up to approximately fifty percent. The term "metal" for purposes of the claims, is defined to mean metal that have melting points above 500 degrees Fahrenheit.

It is preferable that the material used in sheet portions 20, 30 be somewhat malleable even though it should be rigid enough to maintain a fixed shape, as stated. This is so that the manufacturing of the sheet portions 20, 30 can be done by simply shaping sheets of the material, such as aluminum, into the desired form. However, the material of sheet portions 20, 30 should not be so malleable that it does not maintain both in storage and in use the shape needed to mate with the cooking surfaces of the grill. Another reason why a degree of malleability in sheet portions 20, 30 is desirable is that tabs 28a, 28b, 38a, 38b, see below, have to be folded over to operate and it is preferable that these tabs be made of the same material as sheet portions 20, 30. Accordingly, it is preferred that sheet portions 20, 30 be approximately as malleable as extra heavy duty aluminum.

Sheet portions 20, 30 are treated so that on the active surfaces 24, 34 of each sheet that re in contact with the food have a non-stick coating 24a, 34a thereon that prevents food being grilled from sticking to the upper surface 24 of sheet 20 and to the lower surface 34 of sheet 30. Non-stick coating 24a, 34a also is such that it does not transfer to food that is in direct contact to it even under very hot temperatures. The reason for the non-stick feature is that the grill itself has a cooking surface that is non-stick. Hence, the assembly 10 maintains the same good properties of the grill products to which it attaches while preventing the problem of having to clean the surfaces of the grill. It should be noted that even though the grill's cooking surfaces are "non-stick", it is a fact that food grime, grease and other residue does in fact accumulate thereon especially when cool and require difficult cleaning after each use. Food safe non-sticking coatings having the above characteristics (safe with food, does not transfer to the food, is non-stick) even at very high temperatures commonly experienced during grilling are known to be suitable for application to aluminum foil. For example, Reynolds Wrap® sells non-stick aluminum under the brand name "Release" which has these characteristics and is available to the needed thicknesses.

A consumer using cover assembly 10 of the present invention simply places sheet portions 20, 30 of sheet 10 over cooking surfaces S1, S2 on the grill's cooking plates before putting the food to be grilled on the primary cooking plate (not the lid or upper cooking plate). Each sheet portion 20, 30 is held in place and secured to the respective cooking surfaces S1, S2 of the cooking plates CP, L of grill g by simple attachment means requiring little effort. For example, tabs 28a, 28b with respect to sheet portion 20 and tabs 38a, 38b with respect to sheet portion 30 are simply folded over the side of the cooking plate exterior to the rim. Thus attachment of grill cover 10 to the grill g need not be and should not be a permanent one. Typically and preferably, tabs 28a, 28b, 38a, 38b may be merely extensions of the layer of material of sheet portions 20, 30, such as the aluminum foil, and these tabs then do not represent an additional layer of material. Alternatively, tabs 28a, 28b, 38a, 38b can represent an additional layer of the same material as sheet portions 20, 30 having heat resistant adhesive connecting the two. Thus it is contemplated in an alternative and less preferable embodiment that tabs 28a, 28b, 38a, 38b may also be formed from or include removably attachable materials such as an adhesive able to withstand high temperatures at the surfaces of the grill g. Adhesives that qualify as being able to withstand such high temperatures include certain kinds of epoxy resins.

The present invention contemplates an undefined number of tabs for attaching each sheet portion 20, 30 to each cooking surface of the grill. Preferably, the number of tabs for each sheet of sheet portions 20, 30 is one, two or three on each side of the sheet. For example, FIG. 1 shows two tabs on each side of sheet portions 20, 30: two tabs 28a, 28b on one side of sheet portion 20 and two tabs 28c, 28d on the other side of sheet portion 20 and two tabs 38a, 38b on one side of sheet portion 30 and two tabs 38c, 38d on the other side of sheet portion 30.

The cover assembly 10 of the present invention thus renders cleaning the grill's cooking surfaces unnecessary. After use of the grill, simply remove the sheets 20, 30 of assembly 10 and throw them out. It should be noted that the sheet portions 20, 30 are removed after grill g has cooled down. Grill cover 10 can work in conjunction with heat alert safety devices that are presently the subject of patent applications of Applicant (for example application Ser. Nos. 10/238,348, 09/788,594) wherein the fact that a surface is no longer hot is discerned from the presence of absence of a heat warning message conveniently located on each surface of the appliance.

In the case of the George Foreman® grill, as seen in FIG. 4, a front extension 21 of first sheet portion 20 extends over the front bumps b of the grill and then continues forward so that it extends into the drip tray d so that sheet portion 20 covers an inside surface of a drip tray positioned in front of and approximately adjacent the grill. Thus, sheet portion 20 also extends into the entire inner surface of the drip tray d. This makes cleaning the drip tray d unnecessary.

In an alternative embodiment of the present invention, cover assembly 10 would consist of sheet portions 20, 30 that would have contoured surfaces other than ribs such as any topography including flat, bumps, designs, etc. and would be used to cover in a mating relation to the corresponding cooking surfaces of grills, panini makers, which grill paninis (cheese and/or sandwiches) and quesadilla makers, which grill quesadilla (filled wheat tortilla topped with meat and/or cheese). The surfaces of these appliances collect food residues.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A grill cover for covering an indoor counter top grill, the grill including a first cooking plate having a first cooking surface, the first cooking surface having a first rim and including a lid having a second cooking surface, the second cooking surface having a second rim, said first and said second cooking surfaces each having parallel elongated raised portions, the grill cover comprising:

a first thin sheet portion of aluminum having a fixed shape, and a fixed width and length to cover the first rim, a contoured surface of the first thin sheet portion corresponding to a contoured surface of the first cooking surface and including parallel ribs running through the thickness of the first thin sheet portion so that said first thin sheet portion when placed on the first cooking surface fits snugly thereon, the first thin sheet portion including at least one right tab extending therefrom for attaching a right side of the first thin sheet portion to a right side of the first cooking surface exterior to the first rim and including at least one left tab extending therefrom for attaching a left side of the first thin sheet portion to a left side of the first cooking surface exterior to the first rim, a second thin sheet portion of aluminum having a fixed shape, and a fixed width and length to cover the second rim, a contoured surface of the second thin sheet portion corresponding to a contoured surface of the second cooking surface and including parallel ribs running through the thickness of the second thin sheet portion so that said second thin sheet portion when placed on the second cooking surface fits snugly thereon, the second thin sheet portion including at least one right tab extending therefrom for attaching a right side of the second thin sheet portion to a right side of the first cooking surface exterior to the second rim and including at least one left tab extending therefrom for attaching a left side of the second thin sheet portion to a left side of the second cooking surface exterior to the second rim, the first sheet portion and the second sheet portion forming a single continuous sheet.

2. The grill cover of claim 1, wherein an upper surface of the first thin sheet portion and a lower surface of the second thin sheet portion have a non-stick coating thereon.

3. The grill cover of claim 1, wherein a front of the first thin sheet portion extends into and covering an inside surface of a drip tray positioned in front of and approximately adjacent the grill.

4. The grill cover of claim 3, wherein an upper surface of the first thin sheet portion and a lower surface of the second thin sheet portion have a non-stick coating thereon.

5. The grill cover of claim 1, wherein the aluminum is aluminum foil having a thickness of between approximately half a mil and five mils.

6. The grill cover of claim 5, wherein the aluminum foil is extra heavy duty aluminum foil.

7. The grill cover of claim 5, wherein an upper surface of the first thin sheet portion and a lower surface of the second thin sheet portion have a non-stick coating thereon.

8. The grill cover of claim 7, wherein a front of the first thin sheet portion extends into and covering an inside surface of a drip tray positioned in front of and approximately adjacent the grill.

9. The grill cover of claim 1, wherein each of the parallel ribs have bumps at or near a front end of the parallel ribs.

10. The grill cover of claim 9, wherein an upper surface of the first thin sheet portion and a lower surface of the second thin sheet portion have a non-stick coating thereon.

11. The grill cover of claim 9, wherein a front of the first thin sheet portion extends into and covering an inside surface of a drip tray positioned in front of and approximately adjacent the grill.

12. The grill cover of claim 11, wherein an upper surface of the first thin sheet portion and a lower surface of the second thin sheet portion have a non-stick coating thereon.

13. The grill cover of claim 9, wherein the aluminum is aluminum foil having a thickness of between approximately half a mil and five mils.

14. A grill cover for covering an indoor counter top grill, the grill including a first cooking plate having a first cooking surface, the first cooking surface having a first rim and including a lid having a second cooking surface, the second cooking surface having a second rim, said first and said second cooking surfaces each having parallel elongated raised portions, the grill cover comprising:

a first thin sheet of aluminum having a fixed shape, and a fixed width and length to cover the first rim, a contoured surface of the first thin sheet corresponding to a contoured surface of the first cooking surface and including parallel ribs running through the thickness of the first thin sheet so that said first thin sheet when placed on the first cooking surface fits snugly thereon, the first thin sheet including at least one right tab extending therefrom for attaching a right side of the first thin sheet to a right side of the first cooking surface exterior to the first rim and including at least one left tab extending therefrom for attaching a left side of the first thin sheet to a left side of the first cooking surface exterior to the first rim, a second thin sheet of aluminum having a fixed shape, and a fixed width and length to cover the second rim, a contoured surface of the second thin sheet corresponding to a contoured surface of the second cooking surface and including parallel ribs running through the thickness of the second thin sheet so that said second thin sheet when placed on the second cooking surface fits snugly thereon, the second thin sheet including at least one right tab extending therefrom for attaching a right side of the second thin sheet to a right side of the first cooking surface exterior to the second rim and including at least one left tab extending therefrom for attaching a left side of the second thin sheet to a left side of the second cooking surface exterior to the second rim.

15. The grill cover of claim 14, wherein an upper surface of the first thin sheet and a lower surface of the second thin sheet have a non-stick coating thereon.

16. The grill cover of claim 14, wherein a front of the first thin sheet extends into and covering an inside surface of a drip tray positioned in front of and approximately adjacent the grill.

17. The grill cover of claim 16, wherein an upper surface of the first thin sheet portion and a lower surface of the second thin sheet have a non-stick coating thereon.

18. The grill cover of claim 14, wherein the aluminum is aluminum foil having a thickness of between approximately half a mil and five mils.

19. The grill cover of claim 18, wherein the aluminum foil is extra heavy duty aluminum foil.

20. The grill cover of claim 18, wherein an upper surface of the first thin sheet portion and a lower surface of the second thin sheet portion have a non-stick coating thereon.

21. The grill cover of claim 18, wherein a front of the first thin sheet portion extends into and covering an inside surface of a drip tray positioned in front of and approximately adjacent the grill.

22. The grill cover of claim 14, wherein each of the parallel ribs have bumps at or near a front end of the parallel ribs.

23. The grill cover of claim 22, wherein an upper surface of the first thin sheet portion and a lower surface of the second thin sheet portion have a non-stick coating thereon.

24. The grill cover of claim 22, wherein a front of the first thin sheet portion extends into and covering an inside surface of a drip tray positioned in front of and approximately adjacent the grill.

25. The grill cover of claim 24, wherein an upper surface of the first thin sheet portion and a lower surface of the second thin sheet portion have a non-stick coating thereon.

26. The grill cover of claim 22, wherein the aluminum is aluminum foil having a thickness of between approximately half a mil and five mils.

27. A grill cover for covering an indoor counter top grill, the grill including a first cooking plate having a first cooking surface, the first cooking surface having a first rim and including a lid having a second cooking surface, the second cooking surface having a second rim, said first and said second cooking surfaces each having parallel elongated raised portions, the grill cover comprising:

a first thin sheet portion of an easily moldable lightweight and inexpensive metal having a fixed shape, and a fixed width and length to cover the first rim, a contoured surface of the first thin sheet portion corresponding to a contoured surface of the first cooking surface and including parallel ribs running through the thickness of the first thin sheet portion so that said first thin sheet portion when placed on the first cooking surface fits snugly thereon, the first thin sheet portion including at least one right tab extending therefrom for attaching a right side of the first thin sheet portion to a right side of the first cooking surface exterior to the first rim and including at least one left tab extending therefrom for attaching a left side of the first thin sheet portion to a left side of the first cooking surface exterior to the first rim, a second thin sheet portion of an easily moldable lightweight and inexpensive metal having a fixed shape, and a fixed width and length to cover the second rim, a contoured surface of the second thin sheet portion corresponding to a contoured surface of the second cooking surface and including parallel ribs running through the thickness of the second thin sheet portion so that said second thin sheet portion when placed on the second cooking surface fits snugly thereon, the second thin sheet portion including at least one right tab extending therefrom for attaching a right side of the second thin sheet portion to a right side of the first cooking surface exterior to the second rim and including at least one left tab extending therefrom for attaching a left side of the second thin sheet portion to a left side of the second cooking surface exterior to the second rim, the first sheet portion and the second sheet portion forming a single continuous sheet.

28. The grill cover of claim 27, wherein an upper surface of the first thin sheet portion and a lower surface of the second thin sheet portion have a non-stick coating thereon, wherein a front of the first thin sheet portion extends into and covering an inside surface of a drip tray positioned in front of and approximately adjacent the grill and wherein each of the parallel ribs have bumps at or near a front end of the parallel ribs.

29. A grill cover for covering an indoor counter top grill, the grill including a first cooking plate having a first cooking surface, the first cooking surface having a first rim and including a lid having a second cooking surface, the second cooking surface having a second rim, said first and said second cooking surfaces each having parallel elongated raised portions, the grill cover comprising:

a first thin sheet of an easily moldable lightweight and inexpensive metal having a fixed shape, and a fixed width and length to cover the first rim, a contoured surface of the fist thin sheet corresponding to a contoured surface of the first cooking surface and including parallel ribs running through the thickness of the first thin sheet so that said first thin sheet when placed on the first cooking surface fits snugly thereon, the first thin sheet including at least one right tab extending therefrom for attaching a right side of the first thin sheet to a right side of the first cooking surface exterior to the first rim and including at least one left tab extending therefrom for attaching a left side of the first thin sheet to a left side of the first cooking surface exterior to the first rim, a second thin sheet of an easily moldable lightweight and inexpensive metal having a fixed shape, and a fixed width and length to cover the second rim, a contoured surface of the second thin sheet corresponding to a contoured surface of the second cooking surface and including parallel ribs running through the thickness of the second thin sheet so that said second thin sheet when placed on the second cooking surface fits snugly thereon, the second thin sheet including at least one right tab extending therefrom for attaching a right side of the second thin sheet to a right side of the first cooking surface exterior to the second rim and including at least one left tab extending therefrom for attaching a left side of the second thin sheet to a left side of the second cooking surface exterior to the second rim.

30. The grill cover of claim 29, wherein an upper surface of the first thin sheet and a lower surface of the second thin sheet have a non-stick coating thereon, wherein a front of the first thin sheet extends into and covering an inside surface of a drip tray positioned in front of and approximately adjacent the grill and wherein each of the parallel ribs have bumps at or near a front end of the parallel ribs.

31. A grill cover for covering an indoor counter top grill, the grill including a first cooking place having a first cooking surface, the first cooking surface having a first rim and including a lid having a second cooking surface, the second cooking surface having a second rim, said first and said second cooking surfaces each having parallel elongated raised portions, the grill cover comprising:

- a first thin sheet portion of a durable lightweight inexpensive easily moldable material able to withstand 450 degrees Fahrenheit for 45 minutes and having a fixed shape, and a fixed width and length to cover the first rim, a contoured surface of the first thin sheet portion corresponding to a contoured surface of the first cooking surface and including parallel ribs running through the thickness of the first thin sheet portion so that said first thin sheet portion when placed on the first cooking surface fits snugly thereon, the first thin sheet portion including at least one right tab extending therefrom for attaching a right side of the first thin sheet portion to a right side of the first cooking surface exterior to the first rim and including at least one left tab extending therefrom for attaching a left side of the first thin sheet portion to a left side of the first cooking surface exterior to the first rim,
- a second thin sheet portion of durable lightweight inexpensive easily moldable material able to withstand 450 degrees Fahrenheit for 45 minutes and having a fixed shape, and a fixed width and length to cover the second rim, a contoured surface of the second thin sheet portion corresponding to a contoured surface of the second cooking surface and including parallel ribs running through the thickness of the second thin sheet portion so that said second thin sheet portion when placed on the second cooking surface fits snugly thereon,
- the second thin sheet portion including at least one right tab extending therefrom for attaching a right side of the second thin sheet portion to a right side of the second cooking surface exterior to the second rim and including at least one left tab extending therefrom for attaching a left side of the second thin sheet portion to a left side of the second cooking surface exterior to the second rim,
- the first sheet portion and the second sheet portion forming a single continuous sheet.

32. The grill cover of claim 31, wherein an upper surface of the first thin sheet portion and a lower surface of the second thin sheet portion have a non-stick coating thereon, wherein a front of the first thin sheet portion extends into and covering an inside surface of a drip tray positioned in front of and approximately adjacent the grill and wherein each of the parallel ribs have bumps at or near a front end of the parallel ribs.

33. A grill cover for covering an indoor counter top grill, the grill including a first cooking plate having a first cooking surface, the first cooking surface having a first rim and including a lid having a second cooking surface, the second cooking surface having a second rim, said first and said second cooking surfaces each having parallel elongated raised portions, the grill cover comprising:

- a first thin sheet of durable lightweight inexpensive easily moldable material able to withstand 450 degrees Fahrenheit for 45 minutes and having a fixed shape, and a fixed width and length to cover the first rim, a contoured surface of the first thin sheet corresponding to a contoured surface of the first cooking surface and including parallel ribs running through the thickness of the first thin sheet so that said first thin sheet when placed on the first cooking surface fits snugly thereon,
  the first thin sheet including at least one right tab extending therefrom for attaching a right side of the first thin sheet to a right side of the first cooking surface exterior to the first rim and including at least one left tab extending therefrom for attaching a left side of the first thin sheet to a left side of the first cooking surface exterior to the first rim,
- a second thin sheet of durable lightweight inexpensive easily moldable material able to withstand 450 degrees Fahrenheit for 45 minutes and having a fixed shape, and a fixed width and length to cover the second rim, a contoured surface of the second thin sheet corresponding to a contoured surface of the second cooking surface and including parallel ribs running through the thickness of the second thin sheet so that said second thin sheet when placed on the second cooking surface fits snugly thereon,
- the second thin sheet including at least one right tab extending therefrom for attaching a right side of the second thin sheet to a right side of the first cooking surface exterior to the second rim and including at least one left tab extending therefrom for attaching a left side of the second thin sheet to a left side of the second cooking surface exterior to the second rim.

34. The grill cover of claim 33, wherein an upper surface of the first thin sheet and a lower surface of the second thin sheet have a non-stick coating thereon, wherein a front of the first thin sheet extends into and covering an inside surface of a drip tray positioned in front of and approximately adjacent the grill and wherein each of the parallel ribs have bumps at or near a front end of the parallel ribs.

35. A grill cover for covering a first cooking surface of a first cooking plate of an indoor counter top grill, the first cooking surface having a first rim and paralled elongated raised portions, the grill cover comprising:

- a first thin sheet of durable easily moldable lightweight inexpensive material able to withstand approximately 450 degrees Fahrenheit for approximately 45 minutes and having a fixed shape, and a fixed width and length to cover the first rim, a contoured surface of the first thin sheet corresponding to a contoured surface of the first cooking surface and including parallel ribs running through the thickness of the first thin sheet so that said first thin sheet when placed on the first cooking surface fits snugly thereon
- wherein the first thin sheet includes at least one right tab extending therefrom for attaching a right side of the first thin sheet to a right side of the first cooking surface exterior to the first rim and/or includes at least one left tab extending therefrom for attaching a left side of the first thin sheet to a left side of the first cooking surface exterior to the first rim.

36. The grill cover of claim 35, wherein the material is aluminum.

37. The grill cover of claim 36, wherein the aluminum is aluminum foil having a thickness of between approximately half a mil and five mils.

38. The grill cover of claim 35, wherein a front of the first thin sheet extends into and covers an inside surface of a drip tray positioned in front of and approximately adjacent the grill.

39. The grill cover of claim 35, wherein each of the parallel ribs have bumps at or near a front end of the parallel ribs.

40. The grill cover of claim 35, wherein an upper surface of the first thin sheet has a non-stick coating thereon.

41. A grill cover for covering a second cooking surface of a lid of an indoor counter top grill, the second cooking surface having a second rim and parallel elongated raised portions, the grill cover comprising:

a second thin sheet of durable easily moldable lightweight inexpensive material able to withstand approximately 450 degrees Fahrenheit for approximately 45 minutes and having a fixed shape, and a fixed width and length to cover the second rim, a contoured surface of the second thin sheet corresponding to a contoured surface of the second cooking surface and including parallel ribs running through the thickness of the second thin sheet so that said second thin sheet when placed on the second cooking surface fits snugly thereon wherein the second thin sheet includes at least one right tab extending therefrom for attaching a right side of the second thin sheet to a right side of the first cooking surface exterior to the second rim and/or includes at least one left tab extending therefrom for attaching a left side of the second thin sheet to a left side of the second cooking surface exterior to the second rim.

42. The grill cover of claim 41, wherein the material is aluminum.

43. The grill cover of claim 42, wherein the aluminum is aluminum foil having a thickness of between approximately half a mil and five mils.

44. The grill cover of claim 41, wherein each of the parallel ribs have bumps at or near a front end of the parallel ribs.

45. The grill cover of claim 41, wherein an active surface of the second thin sheet has a non-stick coating thereon.

* * * * *